United States Patent
Pastula et al.

(10) Patent No.: US 8,202,656 B2
(45) Date of Patent: Jun. 19, 2012

(54) THERMALLY INTEGRATED FUEL CELL SYSTEM

(75) Inventors: Michael Pastula, Calgary (CA); Andrea Tylczak, Calgary (CA); Pawel Fronc, Calgary (CA); Marc Dionne, Calgary (CA); Glenn Price, Calgary (CA); Bryce Sharman, Calgary (CA); Casey Brown, Calgary (CA); Kevin Marchand, Calgary (CA)

(73) Assignee: Versa Power Systems, Ltd., Littleton, CO (US)

( * ) Notice: Subject to any disclaimer, the term of this patent is extended or adjusted under 35 U.S.C. 154(b) by 191 days.

(21) Appl. No.: 12/570,576

(22) Filed: Sep. 30, 2009

(65) Prior Publication Data

US 2010/0015476 A1    Jan. 21, 2010

Related U.S. Application Data

(60) Division of application No. 10/905,958, filed on Jan. 27, 2005, now Pat. No. 7,615,298, and a continuation-in-part of application No. PCT/CA2004/000681, filed on Jun. 5, 2004, which is a continuation of application No. 10/249,772, filed on May 6, 2003, now Pat. No. 7,169,495.

(51) Int. Cl.
*H01M 8/06* (2006.01)
*H01M 8/18* (2006.01)

(52) U.S. Cl. ......... 429/408; 429/415; 429/417; 429/419

(58) Field of Classification Search ........... 429/408–419
See application file for complete search history.

(56) References Cited

U.S. PATENT DOCUMENTS

| | | | |
|---|---|---|---|
| 5,366,819 A | 11/1994 | Hartvigsen et al. |
| 5,763,114 A | 6/1998 | Khandkar et al. |
| 6,551,734 B1 | 4/2003 | Simpkins et al. |
| 7,169,495 B2 | 1/2007 | Patsula et al. |
| 2002/0108309 A1 | 8/2002 | Grieve et al. |

FOREIGN PATENT DOCUMENTS

| | | |
|---|---|---|
| CA | 2298970 | 2/2000 |
| EP | 0580918 A1 | 7/1992 |
| WO | 95/10126 | 4/1995 |
| WO | 97/31399 | 8/1997 |
| WO | 02/05363 | 1/2002 |
| WO | 02/087052 | 10/2002 |
| WO | WO 02087052 A2 * | 10/2002 |

OTHER PUBLICATIONS

Pastula, Michael et al.; Development of Low Temperature SOFC Systems for Remote Power Applications; Article XP-001115052; 2000; pp. 123-132; Calgary, Alberta, Canada.

* cited by examiner

*Primary Examiner* — Karie O'Neill Apicella
(74) *Attorney, Agent, or Firm* — Bennett Jones LLP (57) ABSTRACT

A thermally integrated fuel cell system includes a stack zone, a burner zone and a low temperature zone. The fuel is combined with steam and passed sequentially through a primary reformer and a secondary reformer or a radiative fuel heat exchanger. Air may be passed sequentially through an afterburner heat exchanger and a radiative air heat exchanger such that the radiative heat exchanger may be used to heat the stack zone. The stack exhaust is combusted in an afterburner. Afterburner exhaust heats the primary reformer, the high temperature air heat exchanger, the low temperature air heat exchanger and steam generator. The stack zone includes the stacks, the secondary reformer and the radiative heat exchanger. The burner zone includes the afterburner which includes a start burner, the primary reformer and the high temperature air heat exchanger. The low temperature zone includes the low temperature air heat exchanger and a steam generator.

4 Claims, 5 Drawing Sheets

THERMALLY INTEGRATED FUEL CELL SYSTEM

CROSS REFERENCE TO RELATED APPLICATIONS

This application is a divisional application of U.S. patent application Ser. No. 10/905,958 filed on Jan. 27, 2005; which application is a continuation-in-part of PCT Patent Application No. PCT/CA2004/000681 filed on May 6, 2004, which is a continuation of U.S. patent application Ser. No. 10/249,772 filed on May 6, 2003, now U.S. Pat. No. 7,169,495.

FIELD OF THE INVENTION

The present invention relates to a thermally integrated high temperature fuel cell system.

BACKGROUND OF THE INVENTION

High temperature fuel cells such as solid oxide fuel cells comprise an electrolyte sandwiched between a cathode and an anode. Oxygen reacts with electrons at the cathode to form oxygen ions, which are conducted through the ion-conducting ceramic electrolyte to the anode according to the reaction:

$$\tfrac{1}{2}O_2 + 2e^- \rightarrow O^{2-} \qquad (1)$$

At the anode, oxygen ions combine with hydrogen and carbon monoxide to form water and carbon dioxide thereby liberating electrons according to the exothermic reactions:

$$H_2 + O^{2-} \rightarrow H_2O + 2e^- \qquad (2)$$

$$CO + O^{2-} \rightarrow CO_2 + 2e^- \qquad (3)$$

In conventionally-designed solid oxide fuel cells, the above electrochemical reactions usually take place at temperatures of between about 600° C. and 1000° C. Therefore, thermal management is an important consideration in the design of fuel cell systems. SOFC stacks produce high grade heat and it would obviously improve the overall efficiency of the operation if that high grade heat could be captured and utilized.

Typically, incoming fuel and air streams are preheated both during startup when the stack is at an ambient temperature and during operating conditions when the stack is at an elevated temperature. It is well known to use heat exchangers to extract heat from the stack exhausts, and use that heat to preheat incoming gas streams.

In PCT Application No. PCT/US02/12315 (WO02/087052), a waste energy subassembly is provided which includes a combustion zone and a heat exchanger. A separate reformer subassembly provides reformate to the combustion zone where it is combusted to heat the system. Once at operating conditions, the stack exhaust is combusted in the combustion zone and heat is transferred to the incoming air and reformate streams in the heat exchanger. In Applicant's co-pending PCT Application No. CA01/01014, an integrated module is described which is associated with a fuel cell stack and includes an afterburner, a fuel reformer and a heat exchanger. The afterburner burns unused fuel in the fuel cell exhaust streams and heats the fuel reformer and an incoming cathode air stream.

It is a goal of both of these technologies to thermally integrate the fuel cell system and some thermal integration is achieved. However, further integration and better efficiencies may be achievable.

Therefore, there is a need in the art for a thermally integrated fuel cell system.

SUMMARY OF THE INVENTION

The present invention provides a thermally integrated fuel cell system. In one aspect of the invention, the invention may comprise a fuel cell system including a fuel cell stack producing an anode exhaust stream and a cathode exhaust stream, said system comprising:
  (a) a fuel supply assembly for supplying reformate fuel to the stack comprising:
    i. a fuel supply,
    ii. a water heat exchanger for generating steam,
    iii. a primary reformer, and
    iv. a radiative fuel heat exchanger;
  (b) an air supply assembly for supplying air to the stack comprising:
    i. a low temperature air heat exchanger,
    ii. a high temperature air heat exchanger, and
    iii. a radiative air heat exchanger;
  (c) an afterburner which receives the anode and cathode exhaust streams from the fuel cell stack and combusts the exhaust streams to produce a combustion stream;
  (d) wherein the combustion stream provides heat energy to the primary reformer, the high temperature air heat exchanger, the water heat exchanger and the low temperature air heat exchanger; and
  (e) wherein the radiative air heat exchanger and radiative fuel heat exchanger each receive radiative heat energy from the stack.

In one embodiment, the radiative fuel heat exchanger may be a secondary reformer where additional fuel reforming takes place. The air supply assembly may comprise a first air stream which passes through the high temperature air heat exchanger and a second air stream which passes through the radiative air heat exchanger, wherein the first air stream and second air stream combine downstream from the radiative air heat exchanger. The system may additionally comprise an equalization heat exchanger which receives a reformate supply, the first air stream and the second air stream and outputs a temperature equalized reformate stream and an air stream to the stack.

In an alternative embodiment, the air supply assembly may comprise an air stream which passes through the high temperature heat exchanger and the radiative air heat exchanger in series. Optionally, the air supply assembly may further comprise a bypass air stream which does not pass through the high temperature heat exchanger. As well, the fuel supply assembly may further comprise a bypass fuel stream which does not pass through the fuel reformer thereby adjusting effectively the amount of reformer reforming.

In one aspect of the invention, the invention may comprise a fuel cell system comprising a fuel cell stack and further comprising:
  (a) an air supply for providing air to the stack;
  (b) a fuel supply including a fuel reformer for providing reformate fuel to the stack;
  (c) an afterburner which burns raw fuel or unused fuel in an anode exhaust stream, or both raw fuel and unused fuel in the anode exhaust stream and which comprises a start burner;
  (d) an afterburner heat exchanger for transferring heat from the afterburner to the air supply and the fuel supply; and (e) a radiative heat exchanger for exchanging heat between the fuel cell stack and the air supply or the fuel supply, or both the air supply and the fuel supply, primarily by radiation.

In one embodiment, the air supply may comprise a first air stream which receives heat from the afterburner heat exchanger and a second air stream which receives heat from the radiative heat exchanger, wherein the first air stream and the second air stream combine at a point downstream from the afterburner heat exchanger and the radiative heat exchanger. In an alternative embodiment, the air supply may pass through the afterburner heat exchanger and then through the radiative heat exchanger, and the fuel supply may pass through the afterburner heat exchanger and then through the radiative heat exchanger.

In another aspect, the invention may comprise a method of heating a fuel cell stack on startup comprising the steps of:

(a) operating the start burner and/or afterburner to heat the high temperature air heat exchanger;

(b) directing heated air from the high temperature air heat exchanger to the radiative heat exchanger; and (c) heating the stack with the radiative heat exchanger substantially by radiative means.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

The present invention provides for a thermally integrated fuel cell system. When describing the present invention, all terms not defined herein have their common art-recognized meanings.

Generally, a system of the present invention achieves thermal integration primarily by exchanging heat from the exhaust side to the intake side of the fuel cell system in order to preheat the intake streams. In addition, radiative heat from the fuel cell stack itself is captured, or the stack may be heated by radiative means. The features of the invention described herein may enhance the efficiency or controllability of the system.

Figure 1:
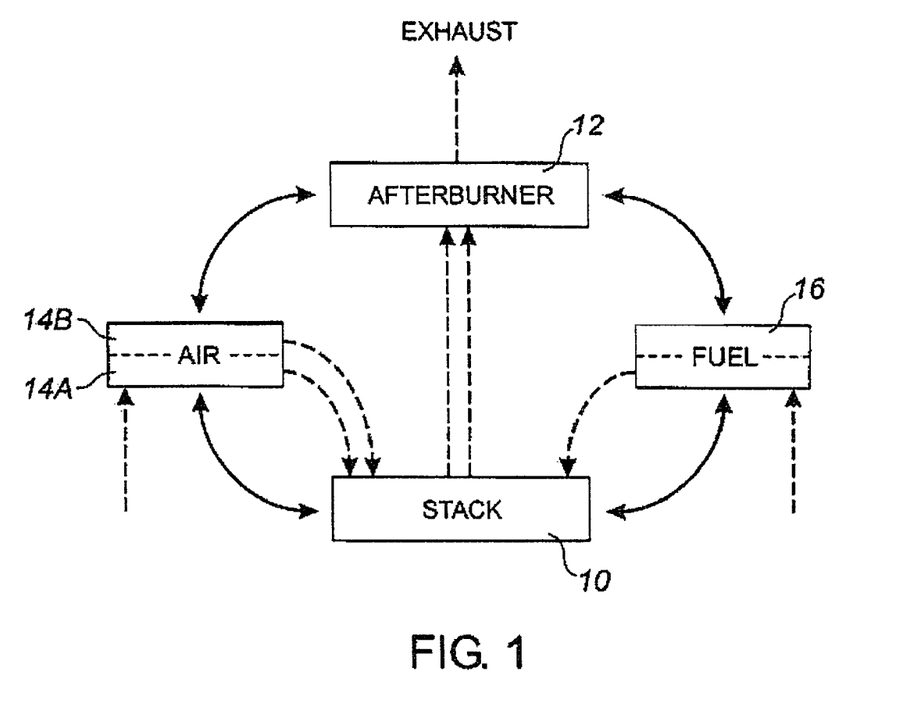
FIG. 1 is a schematic representation of one embodiment of the present invention.

FIG. 1 shows a generalized schematic representation of the high grade heat sources and heat sinks of the present invention. The solid arrows represent heat exchange and not fluid flows. The dashed line arrows represent fluid flows. The system includes two heat sources, which are the fuel cell stack (10) itself, and an afterburner (12). The system also includes two heat sinks, which are the process air stream (14) and the process fuel stream (16). The latter includes a fuel reformer. As depicted in FIG. 1, each of the two heat sinks receives heat from both heat sources. In one embodiment, the process air stream (14) is heated by an afterburner and is also heated by the stack.

In one embodiment depicted in FIG. 1, the process air stream may be separated into two separate parts which flow in parallel. Therefore, one part (14A) of the process air stream receives heat primarily from the stack, while a second part (14B) of the process air stream receives heat primarily from the afterburner. The two parts may then be recombined before entering the stack (10). In another embodiment, the process air stream may be split in series rather than in parallel. The process fuel stream (16) receives heat from the afterburner and also from the stack but is not necessarily split into parallel flows. The split of the process fuel stream may be conceived of as two serial portions. This division of the heat sinks permits greater controllability of the thermal integration of the system. The control system may divert greater flow through a first part of the air heat sink from the second part, which will have the effect of increasing cooling of the heat source associated with first part of the air flow.

An embodiment where the first and second parts of the process air stream flow in parallel may be more suitable for a high temperature fuel cell stack with little to no internal fuel reforming capability. Preferably, there is no direct thermal link between the two heat sources. More preferably, the two heat sources are isolated from each other with thermal insulation, thus maintaining the separate thermal availability of either heat source.

The split of the two heat sinks, the process air stream and the process fuel stream, into two parts, one part of which is thermally linked to the stack as a high grade heat source, and another part of which is thermally linked to the afterburner as the other high grade heat source, permits greater controllability of the system and may provide for a higher degree of thermal efficiency. For example, the stack may be cooled by directing a greater proportion of the process air stream through the part which is thermally linked to the stack. In another example, if greater fuel utilization results in less heat produced by the afterburner, more heat from the stack may be utilized by the heat sinks. These and other control strategies will be apparent to those skilled in the art.

Figure 2:
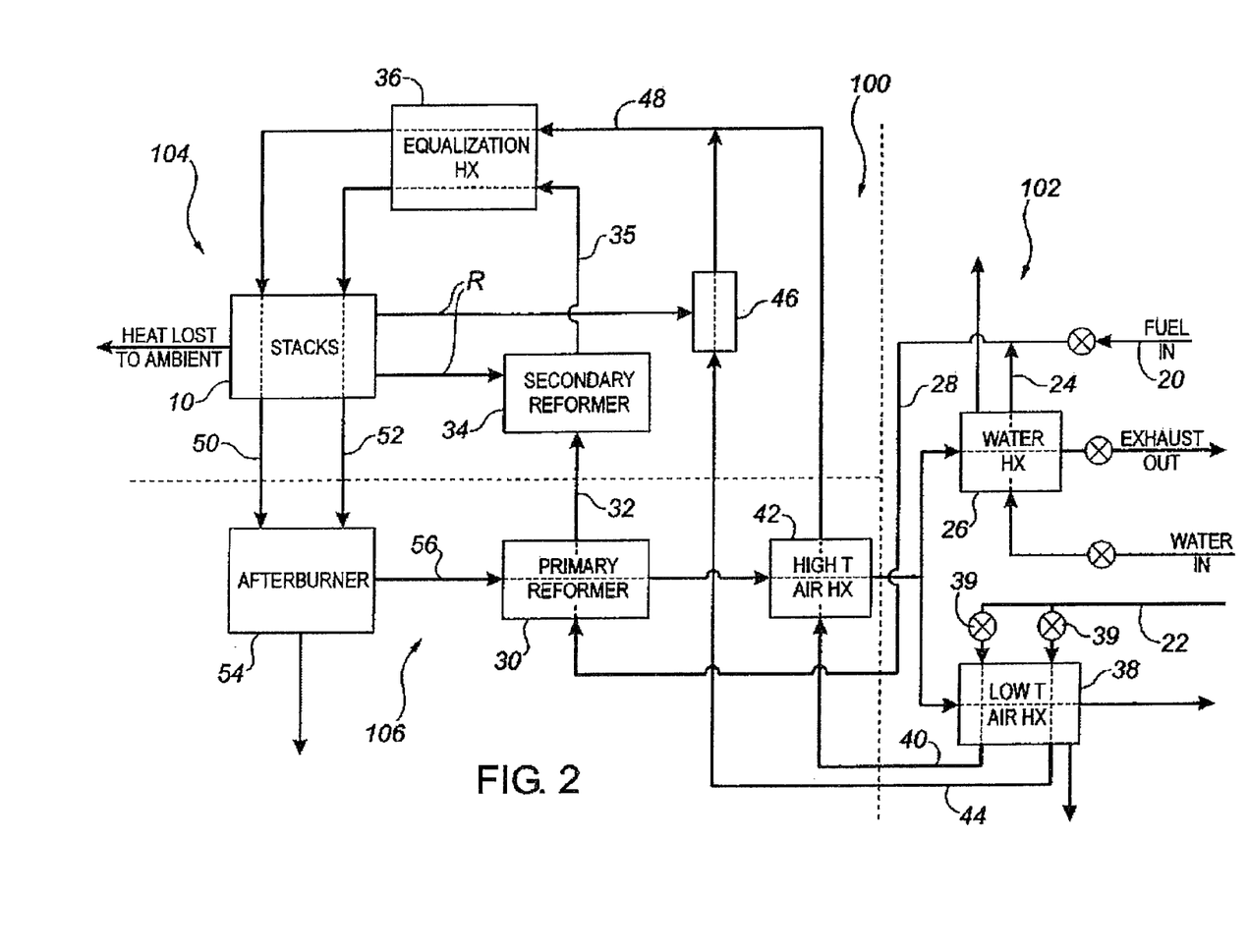
FIG. 2 is a schematic representation of one embodiment of the present invention.

Therefore, in one embodiment of the present invention shown schematically in FIG. 2, a fuel cell system comprises a process fuel source (20) and a process air source (22) both of which may initially be at ambient temperatures. The fuel stream (20) is combined with steam (24) generated by a steam generator (26) or a water heat exchanger. In an alternative embodiment, the fuel may be mixed with water prior to entering into the steam generator (26) or water heat exchanger, or mixed within the heat exchanger itself. The combined steam/fuel stream (28) then enters a primary reformer (30) which reforms the fuel to hydrogen or a mixture of hydrogen and carbon monoxide (syngas) using any reforming process such as catalytic steam reforming, or partial oxidation reforming or some combination of these reforming processes. In one embodiment, the primary reformer is a steam reformer implementing steam reformation of a hydrocarbon such as natural gas. The reformate stream (32) then passes into a secondary reformer (34) where additional reforming to hydrogen or syngas takes place, leveraging radiative heat from the stack when needed. The secondary reformer may implement the same or different reforming process as the primary reformer.

The secondary reformate stream (35) may then be passed through an optional equalization heat exchanger (36) which serves to equalize the temperature between the reformate stream (35) and the heated air stream (48) before entering the fuel cell stack (10) and which also receives some heat energy from the stack (10). The equalization heat exchanger is an optional component and may assist in minimizing any temperature gradients between the stack and the incoming reactants.

The air source (22) initially passes into a low temperature air heat exchanger (38) where it is split into two streams. A valve (39) or diverter, or independent valves, may direct air equally into both streams, into one stream to the exclusion of the other, or direct a greater proportion of air into one stream. It is preferable to split the air stream prior to entry into the low temperature air heat exchanger so as to avoid the need for high temperature materials for the valves (39). A first air stream (40) passes to a high temperature air heat exchanger (42) while a second air stream (44) goes on to a radiative heat exchanger (46). The two streams from the high temperature air heat exchanger (42) and the radiative heat exchanger (46) are then combined into a heated air stream (48) before entering the equalization heat exchanger (36) or the stack itself (10).

Once reacted in the stacks, the cathode exhaust (50) and the anode exhaust (52) pass into an afterburner (54) where any residual fuel in the exhaust stream is combusted. The cathode and anode exhausts are combined at this stage, and the cathode exhaust preferably provides sufficient residual oxygen necessary for combustion of any remaining fuel in the afterburner (54). The hot afterburner exhaust (56) is used first to heat the fuel input stream in the primary reformer (30) and the air input stream in the high temperature air heat exchanger (42). In one embodiment, the afterburner (54) is combined with the primary reformer (30) and the high temperature air heat exchanger in an afterburner heat exchanger (54) which may be an integrated module (not shown). An exemplary integrated module is illustrated and described in U.S. Pat. No. 6,749,958, issued Jun. 15, 2004 and entitled "Integrated Module for Solid Oxide Fuel Cell Systems", the contents of which are incorporated herein by reference. As used herein, an "afterburner heat exchanger" is intended to refer to any heat exchanger which extracts heat from the afterburner or the afterburner exhaust. Therefore, both the primary reformer (30) and the high temperature air heat exchanger (42) may be considered part of an afterburner heat exchanger.

Upon exiting the afterburner heat exchanger, the hot exhaust stream (56) may then be used to heat the steam generator (26) or water heat exchanger in the fuel supply and the low temperature air heat exchanger (38) in the air supply. The exhaust stream may be split to heat these heat exchange elements, or they may be heated in series.

In one embodiment, the secondary reformer (34) and the radiative heat exchanger (46) are positioned to receive radiative energy (R) from the stacks (10). The heat from the stacks is available from the inefficiency in the electrochemical stack reactions.

The afterburner may also include a start burner (not shown), or start burner capability, which burns unreformed or raw fuel and exhausts into the same exhaust as the afterburner (56).

Figure 3:
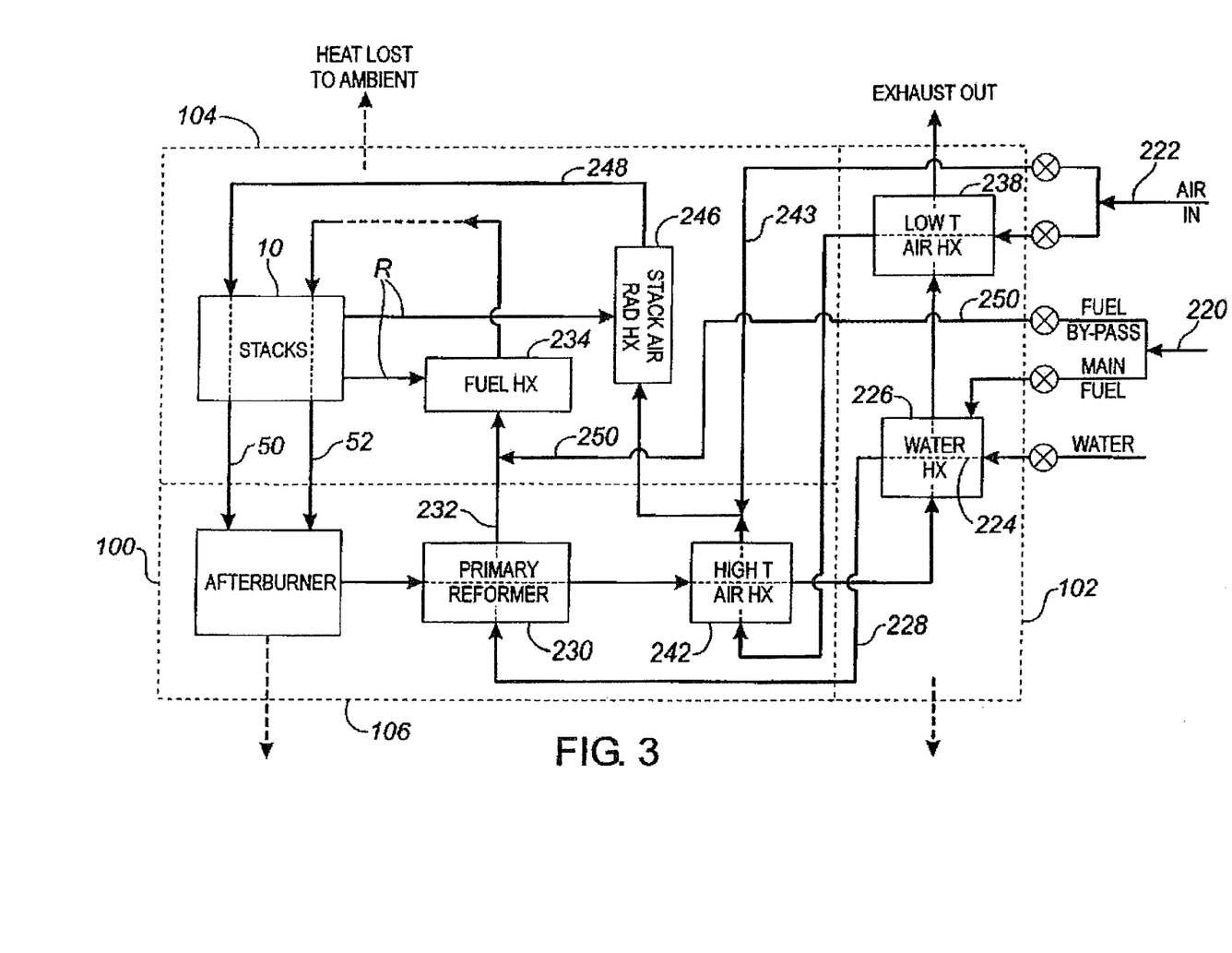
FIG. 3 is schematic representation of one alternative embodiment of the present invention.

In an alternative embodiment of the present invention, as shown schematically in FIG. 3, a fuel cell system may comprise a process fuel source (220) and a process air source (222) both of which may be at ambient temperatures. The fuel stream (220) is combined with steam (224) generated by a water heat exchanger (226) or a steam generator. The combined steam/fuel stream (228) then enters a primary reformer (230). In one embodiment, the primary reformer is a steam reformer which reforms natural gas into syngas. The reformate stream (232) then passes into a radiative fuel heat exchanger (234) where the reformate stream is heated by radiation from the fuel cell stacks. The reformate stream then enters the fuel cell stacks (10).

In the embodiment shown in FIG. 3, the optional equalization heat exchanger described above is omitted. The equalization heat exchanger is an optional component and may assist in minimizing the temperature gradients between the stack and the incoming reactants.

A bypass fuel stream (250) may be provided which adds unheated and unreformed fuel to the process fuel stream at a point upstream of the radiative fuel heat exchanger (234). The bypass fuel stream may be used to adjust the hydrocarbon mix of the fuel utilized by the stacks (10) and to lower the temperature of the fuel entering the stacks (10).

The air source (222) passes into a low temperature air heat exchanger (238) and from there into the high temperature air heat exchanger (242) and then into the radiative air heat exchanger (246). In one embodiment, a bypass air source (243) bypasses both the low and high temperature air heat exchangers and joins the process air stream (222) upstream of the radiative heat exchanger (246). The bypass air source provides a source of cool air, which may be used to cool the stack if necessary. The process air stream (222) then passes through the radiative air heat exchanger (246) to produce a heated air stream (248) which may then pass to the stacks (10) or the optional equalization heat exchanger (not shown). Control of the bypass air source may provide one means of effective control of the stack temperature.

As the heated air stream from the high temperature air heat exchanger is directed to the radiative heat exchanger (246), unlike the configuration illustrated in FIG. 2, the radiative heat exchanger must of course be constructed robust enough in terms of materials and design to withstand input air temperatures which may be 800° C. or higher.

Once reacted in the stacks, the cathode exhaust (50) and the anode exhaust (52) pass into an afterburner heat exchanger assembly (54) where any residual fuel in the exhaust stream is combusted as described above. The afterburner combustion stream is then used for heat exchange as described above. One skilled in the art may realize that the hot air stream exiting the high temperature air heat exchanger (242) may be used to direct radiative energy to the stack from the radiative air heat exchanger (246) which may be useful in startup situations as described below.

Figure 4:
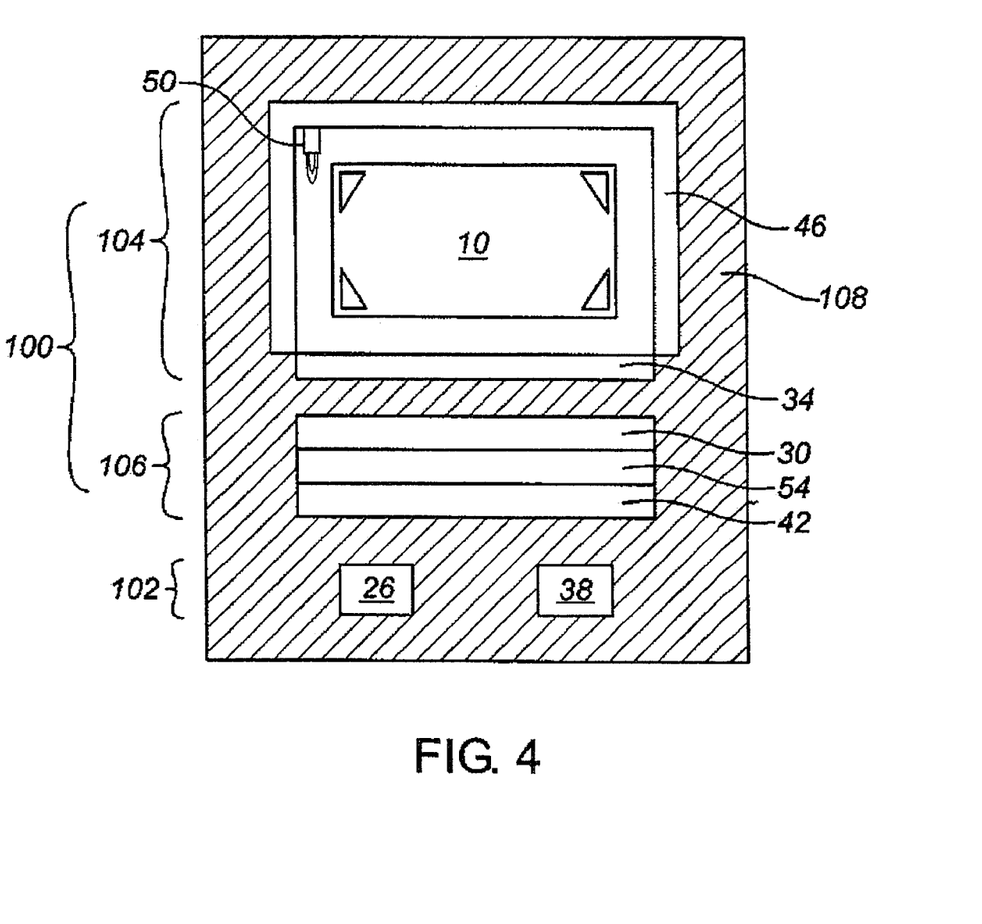
FIG. 4 is a cross-sectional schematic showing the different zones of a system of the present invention.

In one aspect of the invention, the implementation of the present invention may be divided into a hot zone (100) and a low temperature zone (102). The low temperature zone includes the low temperature air heat exchanger (38, 238) and steam generator or water heat exchanger (26, 226). The hot zone (100) may be further divided into a stack zone (104) and a burner zone (106), which in one embodiment may be an integrated module. As shown in FIG. 4, the stack zone (104) includes the fuel cell stacks (10), the radiative air heat exchanger (46, 246), the equalization heat exchanger (38) and the secondary reformer (34) or radiative fuel heat exchanger (234). The secondary reformer and the radiative heat exchanger may enclose the stacks (10) and preferably have a large surface area directly exposed to the stacks to capture a maximum amount of heat from the stacks. The stack zone is preferably insulated (108) to minimize ambient heat loss. The burner zone or integrated module (106) is also a high temperature zone which includes the afterburner (54), the high temperature air heat exchanger (42) and the primary reformer (30). The burner zone or integrated module (106) is also preferably insulated.

In one embodiment, the stack zone is contained in a stack compartment, which is vented through a catalytic converter, which may be electrically heated for startup, shutdown or other low-temperature operation. Any fuel gases which leak from the stacks are contained within the stack compartment and are combusted directly within the stack zone or eliminated by the catalytic converter before being vented to the atmosphere. The equalization heat exchanger (38), if utilized, and a stack compartment burner (50) are disposed within the stack compartment.

Figure 5:
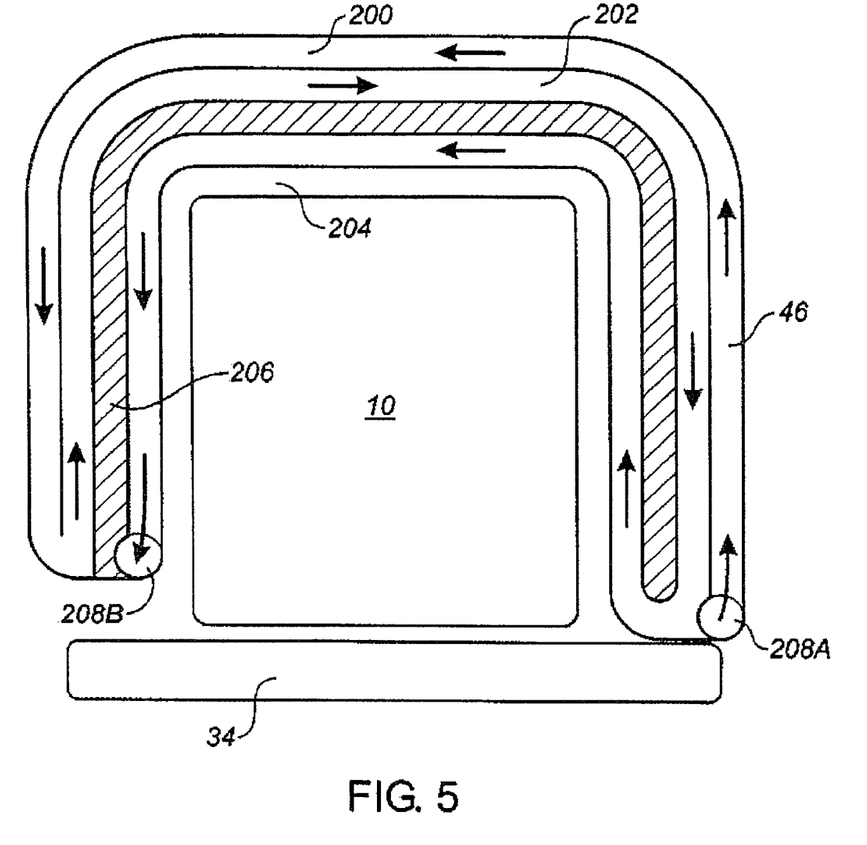
FIG. 5 is a cross-sectional detail of the stack zone of one embodiment.

One embodiment of the stack zone is shown in horizontal cross-section in FIG. 5. The horizontal footprint of the stacks (10) is quadrilateral. Accordingly, the stack enclosure is parallel to the vertical longitudinal axis of the stack and is also quadrilateral. In one embodiment, the radiative air heat exchanger (46, 246) forms three sides of the enclosure while the secondary reformer (34) or radiative fuel heat exchanger (234) forms the fourth side. The equalization heat exchanger may then be disposed below the stack, which is not shown in FIG. 4 or 5. In other embodiments, the stack enclosure may be circular or another geometry may be used.

With reference to FIG. 5, air enters the radiative air heat exchanger (46, 246) through a vertical manifold (208A) and passes through an outer air flow chamber (200) before reversing direction and passing through an intermediate air flow chamber (202). The air then reverses direction again and passes through an inner air flow chamber (204) before exiting from another vertical manifold (208B) and passing to the stack (10) or an equalization heat exchanger. An insulating layer (206) may be provided between the intermediate chamber (202) and the inner chamber (204).

Startup of the stacks (10) when the whole system is at an ambient temperature is initiated by first purging the cathode and exhaust streams, as well as the stack compartment, with air. Process air flow is started, primarily through the first stream, thereby avoiding the radiative heat exchanger (46). In one embodiment, a stack compartment heater (not shown) is provided within the stack zone to provide initial heat to the stacks. The stack compartment heater may be an electric heater or a burner and is typically fired first in a startup procedure. Once the stack compartment heater has raised the stack temperature to about 200° C., the start burner associated with the afterburner is then ignited.

At this stage, the preferred startup sequence depends on whether an anode purge gas is used or not. Anode purge gas may comprise a mixture of nitrogen or argon with a small amount of hydrogen, and serves to preserve a reducing atmosphere in the fuel reformers as well as the SOFC anodes as the system heats up. If anode purge gas is used, the purge gas flow is initiated after firing of the stack compartment heater and after firing of the startup burner. Once the start burner and the stack compartment burner have brought up the stack temperature to about 700° C., or slightly below the stack operating temperature, the switch from purge gas to process fuel may take place.

If no anode purge gas is used and the startup procedure utilizes process fuel and reformate only, then the process fuel flow is initiated after the start burner is ignited. For steam reformation type systems, it is preferred to ensure the steam to carbon ratio of the process fuel flow is within the range of about 1.8 to about 3.5, and more preferably approximately 2.6 while at operating temperatures to prevent carbon deposition within the system. The steam to carbon ratio may be ramped up from a lower value to the operating value during a startup procedure as thermodynamic properties and equilibrium conditions of the reactants allow.

The hot exhaust from the start burner heats the primary reformer (30), and both the high temperature and low temperature air heat exchangers (42, 38) as well as the steam generator (26) or water heat exchanger (226). As the primary reformer reaches its operating temperature, and the air heat exchangers heat the air, the fuel cell stacks begin operating and the exothermic reactions within the stacks may begin to produce electricity and heat. In one embodiment, it is preferred during startup to direct all or a majority of air flow through the first stream (40) thereby avoiding the radiative air heat exchanger (46). Once the fuel cell stacks (10) approach operating temperatures and begin operating, sufficient radiative heat is produced to allow use of the radiative heat exchanger (46) as well as the high temperature air heat exchanger (42). Once the fuel cell stacks reach an operating temperature, then the stack compartment burner may be shutdown. The stack compartment burner may be required in low power operations to maintain adequate stack temperatures.

In an alternative embodiment, radiative heat from the air radiative heat exchanger (246) may be used to supplement or replace the stack compartment heater in a stack heat up function. The configuration illustrated in FIG. 3 is particularly suited to this task. In this scenario, hot exhaust from the start burner heats the primary reformer (230), and both the high temperature and low temperature air heat exchangers (242, 238) as well as the steam generator (26) or water heat exchanger (226). As the air radiative heat exchanger (246) receives the heated air stream from the high temperature heat exchanger (242), it heats up sufficiently to heat the stack compartment and the stack by radiative means.

The outlet temperature of the high temperature heat exchanger (242) will exceed 600° C., and may exceed 800° C. In a startup operation, the radiative heat exchanger (246) will therefore experience a large temperature differential between its inlet and outlet air streams. In a start up situation, the temperature differential between the inlet and outlet of the radiative heat exchanger may be as high as 500° C.

In one embodiment, this may be used to advantage because of the thermal buffering effect (on cathode inlet temperature) of the radiative heat exchanger (246). The stack does not directly experience the same large temperature differential, but the stack zone receives the same amount of heat.

Conversely, if the process air stream is being used to cool the stack, the inlet temperature may be 800° C. lower than the outlet temperature.

Furthermore, fast transient situations may be accommodated during operation. For example, a considerable amount of heat is extracted from the stack by the radiative heat exchanger during full power operation and an effort to lower the air inlet temperature to the radiative heat exchanger must be made, primarily by using the bypass air source (243). A transition to a zero net condition, where the stack requires heat input, may be accelerated by increasing the air inlet temperature to the radiative heat exchanger.

In any embodiment, it is preferred to provide thermal insulation between the stack zone and the burner zone to permit greater thermal control of the system. The temperature of the stack zone may be independently controlled with greater precision by eliminating or reducing conductive heat transfer from the burner zone to the stack zone.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A method of heating a fuel cell stack on startup, in a system comprising a fuel cell stack; an air supply for providing air to the stack; a fuel supply including a fuel reformer for providing reformate fuel to the stack; an afterburner which burns raw fuel or unused fuel in an anode exhaust stream, or both raw fuel and unused fuel in the anode exhaust stream, and which comprises a start burner; an afterburner heat exchanger for transferring heat from the afterburner to the air supply and the fuel supply; and a radiative heat exchanger for exchanging heat between the fuel cell stack and the air supply and the fuel supply primarily by radiation; wherein the air supply passes through the afterburner heat exchanger and then through the radiative heat exchanger in series, and wherein the fuel supply passes through the afterburner heat exchanger then through the radiative heat exchanger, the method comprising the steps of:
(a) operating the start burner to heat the afterburner heat exchanger;
(b) directing heated air from the afterburner heat exchanger to the radiative heat exchanger; and
(c) heating the stack with the radiative heat exchanger substantially by radiative means, wherein the radiative heat exchanger has at least one major surface area directly exposed to the stack.

2. The method of claim 1 wherein the afterburner heat exchanger outlet temperature exceeds 600° C.

3. The method of claim 1 wherein the afterburner heat exchanger outlet temperature exceeds 800° C.

4. The method of claim 1 wherein the radiative heat exchanger has an inlet and an outlet, and the temperature differential between the inlet and outlet is greater than about 500° C.

* * * * *